United States Patent
Ahn et al.

(10) Patent No.: US 10,064,034 B2
(45) Date of Patent: Aug. 28, 2018

(54) METHOD AND APPARATUS FOR CHARGING USE OF RADIO RESOURCES IN WIRELESS COMMUNICATION SYSTEM

(71) Applicant: Samsung Electronics Co., Ltd, Gyeonggi-do (KR)

(72) Inventors: Ra-Yeon Ahn, Seoul (KR); Sung-Jin Lee, Gyeonggi-do (KR); Jung-Soo Jung, Gyeonggi-do (KR); Ji-Won Hwang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/441,210

(22) Filed: Feb. 23, 2017

(65) Prior Publication Data

US 2017/0245131 A1    Aug. 24, 2017

(30) Foreign Application Priority Data

Feb. 23, 2016 (KR) ........................ 10-2016-0021507

(51) Int. Cl.
*H04M 11/00* (2006.01)
*H04W 4/26* (2009.01)
(Continued)

(52) U.S. Cl.
CPC ............... *H04W 4/26* (2013.01); *H04W 4/24* (2013.01); *H04W 4/70* (2018.02); *H04W 76/12* (2018.02); *H04W 88/08* (2013.01)

(58) Field of Classification Search
CPC ..... H04W 4/26; H04W 4/005; H04W 76/022; H04W 88/08; H04W 4/24; H04W 12/12;
(Continued)

(56) References Cited

U.S. PATENT DOCUMENTS 7,436,942 B2 * 10/2008 Hakala ................... H04L 12/14
370/352
8,116,728 B2    2/2012 Cai et al.
(Continued)

FOREIGN PATENT DOCUMENTS

CN    102353906 A  *  2/2012
CN    204745621 U  *  11/2015
(Continued)

OTHER PUBLICATIONS

Draft 3GPP TR 45.820 V.2.0, "3rd Generation Partnership Project;Technical Specification Group GSM/EDGE Radio Access Network;Cellular System Support for Ultra Low Complexity and Low Throughput Internet of Things; (Release 13)", Aug. 2015, 506 pages.

*Primary Examiner* — Mahendra Patel (57) ABSTRACT

The present disclosure relates to a communication technique for combining a 5G communication system that supports higher data transmission rates after 4G systems with IoT technology and to the system therefor. The present disclosure can be applied for intelligent services based on 5G communication technology and IoT related technology (for example, smart homes, smart buildings, smart cities, smart cars or connected cars, healthcare, digital education, retail businesses, security and safety related services, and the like). According to the present disclosure, a method for charging by a base station in a wireless communication system comprises, upon sensing use of a resource by a device performing machine-to-machine (M2M) communication using a resource allocated to the wireless communication system based on a charging reference, gathering charging-related information about the sensed use of the resource and transmitting the charging-related information or charging information to a higher entity.

18 Claims, 9 Drawing Sheets

(51) Int. Cl.
*H04W 4/24* (2018.01)
*H04W 4/70* (2018.01)
*H04W 76/12* (2018.01)
*H04W 88/08* (2009.01)

(58) Field of Classification Search
CPC ......... H04M 11/00; H04M 2215/7435; H04M 15/64; H04M 15/66; H04M 15/8038; H04L 65/1016; H04L 65/4084; H04L 12/14; H04L 12/1403; H04L 12/1425; H04L 41/5051; H04L 12/1407; H04L 12/1417; H04L 12/1435; H04L 41/0893; G06Q 30/04; G06Q 20/145; G06Q 30/016
USPC ......... 455/408, 406; 709/228, 223; 370/259, 370/230
See application file for complete search history.

(56) References Cited

U.S. PATENT DOCUMENTS

| | | | | |
|---|---|---|---|---|
| 2008/0261613 | A1* | 10/2008 | Anderson | H04W 24/02 455/456.1 |
| 2009/0264097 | A1* | 10/2009 | Cai | G06Q 30/04 455/406 |
| 2010/0023372 | A1* | 1/2010 | Gonzalez | G06Q 10/0637 705/7.36 |
| 2010/0217877 | A1* | 8/2010 | Willars | H04W 4/24 709/228 |
| 2011/0202647 | A1* | 8/2011 | Jin | H04L 41/0806 709/223 |
| 2012/0166659 | A1* | 6/2012 | Hjelm | H04L 47/781 709/228 |
| 2013/0044596 | A1* | 2/2013 | Zhi | H04W 48/06 370/230 |
| 2013/0044646 | A1* | 2/2013 | Qu | H04M 15/765 370/259 |
| 2013/0073746 | A1* | 3/2013 | Singh | H04W 56/00 709/248 |
| 2013/0329653 | A1* | 12/2013 | Russell, Jr. | H04W 4/005 370/329 |
| 2013/0343231 | A1* | 12/2013 | Foti | H04L 12/1407 370/259 |
| 2014/0040975 | A1* | 2/2014 | Raleigh | H04W 12/12 726/1 |
| 2015/0156336 | A1* | 6/2015 | Tamura | H04W 48/18 455/406 |

FOREIGN PATENT DOCUMENTS

| | | | | |
|---|---|---|---|---|
| GB | 2506195 A | * | 3/2014 | ......... G06F 9/45558 |
| WO | WO 9904578 A2 | * | 1/1999 | ............ H04M 15/00 |

* cited by examiner

METHOD AND APPARATUS FOR CHARGING USE OF RADIO RESOURCES IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Feb. 23, 2016 and assigned Serial No. 10-2016-0021507, the entire disclosure of which is incorporated herein by reference.

TECHNICAL FIELD

The present disclosure relates to methods and apparatuses for charging use of radio resources in wireless communication systems.

BACKGROUND

In order to meet the demand for wireless data traffic soaring since the 4-generation (4G) communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the internet of things (IoT) network by which information is communicated and processed between things or other distributed components. The internet of everything (IoE) technology may be an example of a combination of the big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC).

In the IoT environment may be offered intelligent internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Regarding 3GPP GSM EDGE radio access network (GERAN) and RAN standardization, there are recently ongoing discussion for wireless communication systems for supporting M2M communication capable of efficient, low-power communication targeting low-cost, low-energy devices. Cellular (C)-IoT, narrow band (NB)-CIoT, long term evolution (NB-LTE), and NB-IoT are among wireless communication system standards that are under discussion. Such wireless communication systems correspond to bluetooth smart, wireless fidelity (Wi-Fi), zigbee, or other short-range wireless systems, a representative example of which is low power wide area (LPWA). Such M2M communication may be adopted for establishing a M2M Internet of telemetry remote sensors, industrial equipment or other apparatuses, electric meters, street lights, pipelines or other various infra structure facilities, health-care, intelligent buildings, or consumer electronics applications through low-cost, low-energy devices. The 5G infrastructure public private partnership, a European 5G research center, anticipates that one-million or more M2M devices will attach per $km^2$. Such M2M communication is supposed to enable enhanced service coverage, low-cost devices, and connection of myriad devices. Thus, service providers may offer the C-IoT using part of the frequency band being used for the global system for mobile communication (GSM) or existing LTE band.

Implementing a low-speed network using part of the LTE infrastructure limits the channel for providing the CIoT to part, e.g., 200 kHz, of the available bandwidth for the existing LTE network. Thus, access by a number of devices at the same time is likely to cause shortage of radio resources.

In order to minimize power consumption by CIoT devices, the position of a device may be classified within the service coverage of a base station based on standards preset between the base station and the device. As a specific example, the position of the device may fall within one of portions in a preset range based on a value obtained by quantizing the pathloss value between the device and the base station. The device may perform operations for achieving energy efficiency using a resource allocation scheme corresponding to the range. According to an embodiment of the present disclosure, although pathloss is chosen as a reference for determining the classification for the position of the device, the present disclosure is not limited to pathloss. According to an embodiment of the present disclosure, examples of the position of the device may encompass a coverage class defined within CIoT service coverage or a coverage level defined by MTC technology. Specifically, the coverage class corresponds to a range set using a quantized pathloss value or may use a pre-defined resource allocation scheme per coverage class. For example, the coverage class increases as pathloss decreases. Thus, retransmission for transmission and reception between device and base station may be carried out to make up for the decreased pathloss, for the reason of which the transmission time is expected to increase up to 32 times or more per coverage class.

Meanwhile, CIoT devices may largely be divided into stationary devices and mobile devices. Mobile devices may be subject to changes in coverage class or cell configuration/reconfiguration due to their mobility, causing additional control signals. Therefore, mobile devices exhibit a significant difference in usage and use time of radio resources as compared with stationary ones.

However, legacy LTE systems do not involve charging the use of radio resources. The sharp growth of CIoT communication for limited resources allocated in the wireless communication system leads to the need for a charging scheme to efficiently operate radio resources.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for charging the use of radio resources in a wireless communication system.

According to the present disclosure, there are proposed a method and apparatus for charging the use of radio resources for CIoT devices in a wireless communication system.

According to the present disclosure, there are proposed a method and apparatus for setting references for charging the use of radio resources for CIoT devices in a wireless communication system and charging the use of radio resources according to the set references.

According to an embodiment of the present disclosure, a method for charging by a base station in a wireless communication system comprises, upon sensing use of a resource by a device identified based on a charging reference, gathering charging-related information about the sensed use of the resource and transmitting the charging-related information or charging information to a higher entity.

According to an embodiment of the present disclosure, an apparatus for charging by a base station in a wireless communication system comprises a controller, upon sensing use of a resource by a device identified based on a charging reference, gathering charging-related information about the sensed use of the resource and a transceiver transmitting the charging-related information or charging information to a higher entity.

Other aspects, advantages, and core features of the present disclosure will be apparent to one of ordinary skill in the art from the following detailed description taken in conjunction with the accompanying drawings and disclosing preferred embodiments of the present disclosure.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to," "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure are described in detail with reference to the accompanying drawings. The same reference numerals are used to refer to same elements throughout the drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present disclosure, the machine-to-machine (M2M) device may be, e.g., an electronic device.

According to an embodiment of the present disclosure, the M2M device is operated as a device using radio resources in a wireless communication system, for example.

Meanwhile, methods and apparatuses as proposed according to an embodiment of the present disclosure may apply to various communication systems, including institute of electrical and electronics engineers (IEEE) 802.11ac communication systems, IEEE 802.16 communication systems, digital multimedia broadcasting (DMB) services, digital video broadcasting-handheld (DVP-H) and advanced television systems committee-mobile/handheld (ATSC-M/H) services or other mobile broadcasting services, internet protocol television (IPTV) services or other digital video broadcasting systems, moving picture experts group (MPEG) media transport (MMT) systems, evolved packet systems (EPSs), long-term evolution (LTE) mobile communication systems, LTE-advanced (LTE-A) mobile communication systems, high speed downlink packet access (HSDPA) mobile communication systems, high speed uplink packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 code division multiple access (CDMA) mobile communication systems, mobile internet protocol (Mobile IP) systems, or so.

For ease of description, examples in which CIoT is implemented on a LTE system are described according to embodiments of the present disclosure. However, embodiments of the present disclosure are not limited as applying only to LTE systems but are rather applicable to other communication systems as well.

Figure 1A:
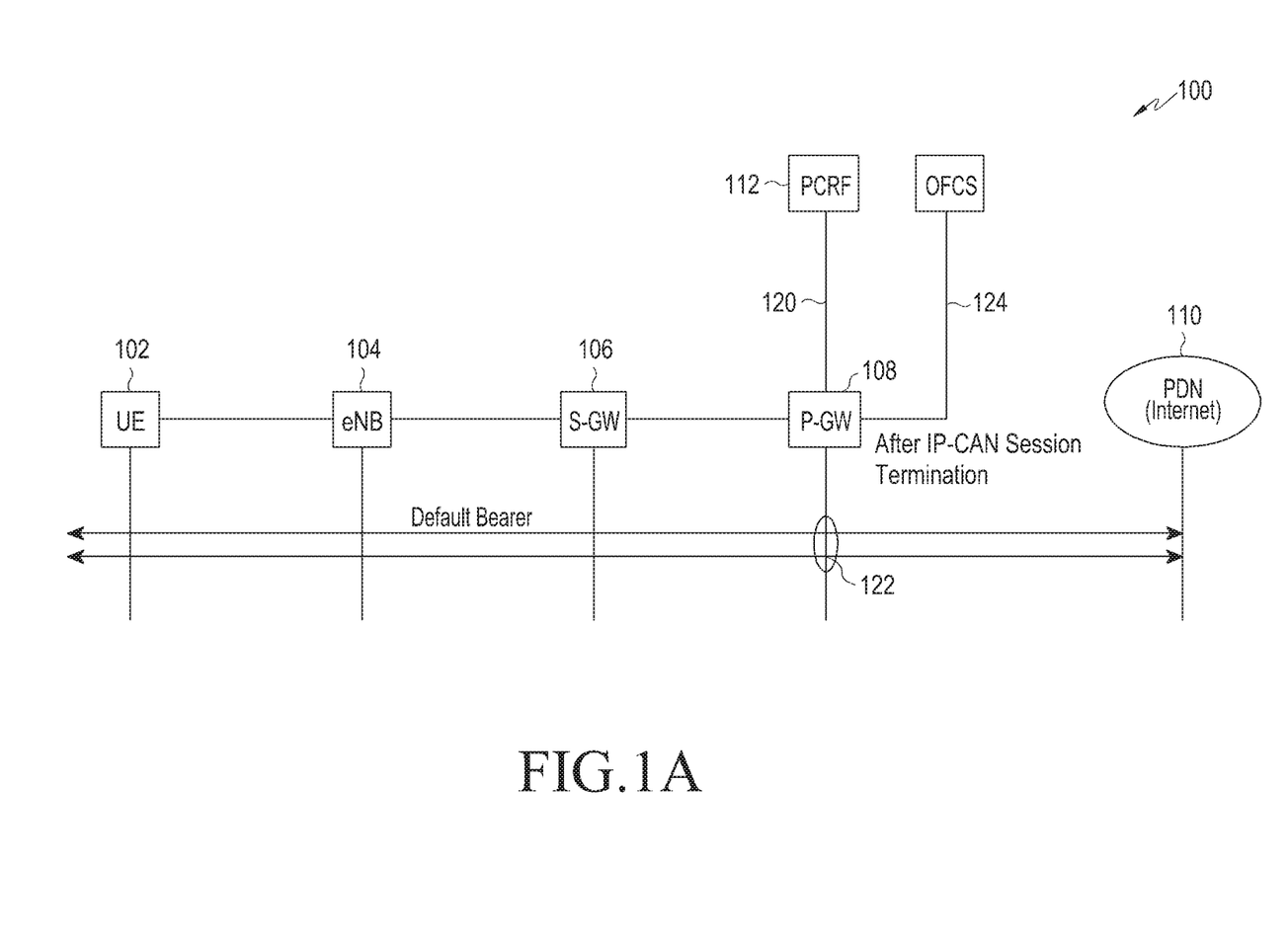
FIG. 1A illustrates an example of a configuration for performing a charging operation in a typical wireless communication system.

FIG. 1a illustrates an example of a configuration for performing a charging operation in a typical wireless communication system.

Referring to FIG. 1a, a LTE system 100 is assumed as an example of the wireless communication system for illustration purposes. Here, the LTE system 100 may include a user equipment (UE) 102, an evolved NodeB (eNB) 104, a serving gateway (S-GW) 106, a packet data network-gateway (P-GW) 108, a policy and charging rules function (PCRF) 112, and a packet data network (PDN) 110.

The PCRF 122 is a software node designated in real-time to determine a policy and charging rules and is in charge of a charging policy and rule of a business provider that are to be applied to a UE positioned within the service coverage of the eNB 104. The S-GW 106 and the P-GW 108 generate charging information for a corresponding UE as per the charging policy and rule provided by the PCRF 112. Further, the P-GW 108 receives the business provider's policy information from the PCRF 112 and fulfills the policy. Here, the charging information includes the user's communication network use information (e.g., usage or use time) monitored, gathered, and managed on the business provider's network and includes a charging data record (CDR). Generally, a charge to the UE's user for a communication service is calculated based on the communication network use information. The PCRF 112 may set a policy and charging control (PCC) rule, e.g., as in Table 1 below and may deliver the set PCC rule to the P-GW 108 in operation 120.

TABLE 1

| PCC rule name | Internet |
|---|---|
| Charging | Offline |
| Rating group | Rg internet (rating for internet use) |
| Dynamic PCC rule | . . . |

Referring to Table 1 above, the PCC rule may include PCC name, charging target, e.g., rating group indicating a rating target for usage, or dynamic PCC rule dynamically variable. In operation 122, the P-GW 108 then applies the received PCC rule using a policy and charging enforcement function (PCEF) to generate charging information for service use of a corresponding device, e.g., the UE 102. In this case, the charging information may correspond to the number of bytes of packet transmission or a packet transmission time. For example, the P-GW 108 may configure the CDR as shown in Tables 2 and 3 below and deliver the CDR to the business provider's charging area.

TABLE 2

| Subscriber ID | IMSI |
|---|---|
| Serving network ID | PLMN ID(MCC + MNC) |
| APN network | Internet |
| Duration | 1462 sec |
| PDN type | IPv4 |
| PDN address served | 10.25.200.1(UE IP) |
| Start time | 18:01:53 |
| End time | 18:47:31 |
| Position of user | ECGI, TAI |

TABLE 3

| Service data list | |
|---|---|
| Rating group | rg internet |
| Time of first use | 18:01:53 |
| Time of last use | 18:47:31 |

TABLE 3-continued

| Service data list | |
|---|---|
| Use time | 1462 sec |
| Data volume (UL) | 154 MB |
| Data volume (DL) | 194.98 MB |
| QoS information | QCI, ARP, . . . |

Referring to Table 2, the CDR may include, e.g., a subscriber identity (ID), a serving network ID, an access point name (APN) network, duration, a PDN type, a PDN address served, a start time, an end time, and position of user. The CDR may further include a service data list. Referring to Table 3, the service data list may include, e.g., a rating group, a time of first use, a time of last use, a total use time, a data volume for each of uplink and downlink, and quality of service (QoS) information.

As set forth above, such charging scheme by the LTE system 100 sets charging only for service data for mobile communication used by the UE but not for use of radio resources. As such, no charging reference is presented for use of radio resources. Further, the P-GW 108, which actually generates charging information, is unaware of information related to radio resources used by the UE, and thus, charging the usage of radio resources requires additional functions or operations.

Hence, according to the present disclosure, there are proposed a method and apparatus for charging the use of limited radio resources in a wireless communication system. To that end, there are provided a method and apparatus for efficiently operating a business provider's policy service by proposing a reference for charging the use of radio resources (hereinafter, "charging reference") and a scheme for performing charging based on the charging reference.

Figure 1B:
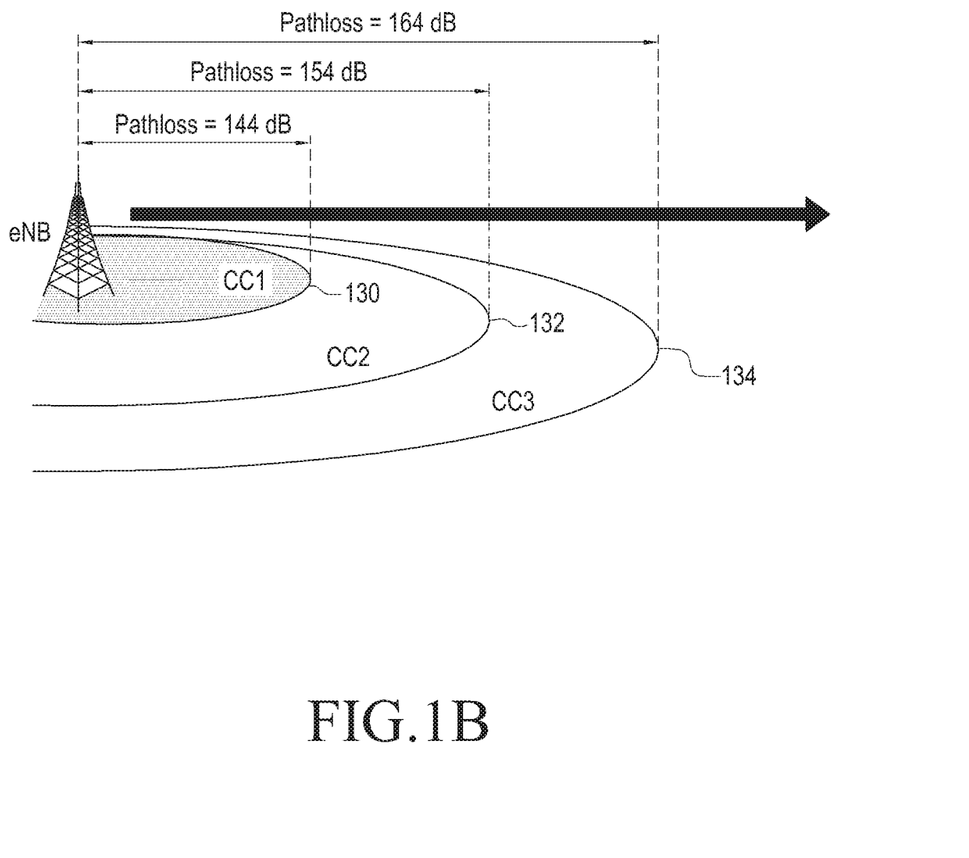
FIG. 1B illustrates example differences in radio resource usage as per the position of a device.

FIG. 1B illustrates example differences in radio resource usage as per the position of a device.

Referring to FIG. 1B, the service coverage of an eNB is divided corresponding to a range set based on a value obtained by quantizing a pathloss value between the eNB and a corresponding device. In the service coverage of the eNB, a range in which the value obtained by quantizing the pathloss value between the eNB and the device with respect to, e.g., the eNB, corresponds to 144 dB is defined as a coverage class CC1 130. Next, a range in which the value obtained by quantizing the pathloss value between the eNB and the device with respect to the eNB corresponds to 154 dB is defined as CC2 132, and a range in which the value obtained by quantizing the pathloss value between the eNB and the device with respect to the eNB corresponds to 164 dB is defined as CC3 134. For ease of description, an example is assumed in which CC1 corresponds to service coverage provided by the eNB on the ground, and CC2 and CC3 correspond to service coverage provided by the eNB under the ground. It is also assumed that the service coverage of CC3 corresponds to an area deeper than that of the service coverage of CC2. Such example is provided merely for description purposes, and CC1 to CC3 are not limited to those in the example.

Table 4 below represents an example of transmission time per CC.

TABLE 4

| | Duration (ms) | |
| --- | --- | --- |
| | PUSCH Short Data (50 bytes) | PUSCH Long Data (200 bytes) |
| coupling loss = 144 dB | 40 | 120 |
| coupling loss = 154 dB | 320 | 960 |
| coupling loss = 164 dB | 1920 | 3840 |

Table 4 presents an example of the time that a device positioned in each CC of FIG. 1b transmits the same size of data to the eNB through the PUSCH. For ease of description, the same size of data is assumed to be 50-byte short data and 200-byte long data. It can be shown from Table 3 that the device positioned in the CC with a larger quantized pathloss value is subject to a longer transmission time regardless of whether short data or long data. Likewise, the device positioned in the CC with a larger quantized pathloss value is subject to more times of retransmission and more usage of radio resources, and the usage/use time of radio resources between CCs may be subject to a ratio difference up to CC1:CC2:CC3=1:8:48. As mentioned above, devices performing mobile communication on the ground may be positioned in CC1. M2M communication devices may be positioned in CC2 and CC3, e.g., ones operated at highly-shadowed locations, such as in basements, manholes, meter closets, or other underground areas. Here, devices performing mobile communication on the ground and M2M communication devices performing communication at highly-shadowed locations are operated as per different resource allocations and resource operations by the eNB. According to an embodiment of the present disclosure, a charging scheme may be carried out distinctively for devices performing mobile communication on the ground and M2M communication devices operated at the highly-shadowed locations.

Where mobility is supported for a corresponding device, a CC change or cell selection/reselection may arise.

Figure 2:
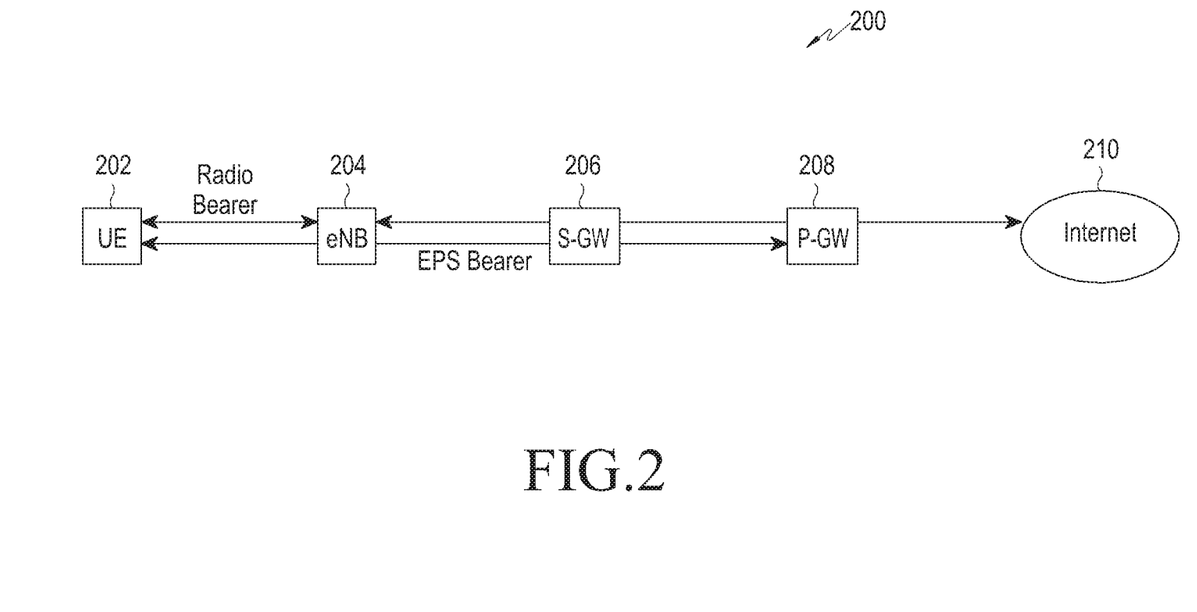
FIG. 2 illustrates an example of a wireless communication system performing charging according to an embodiment of the present disclosure.

Thus, there is proposed a scheme for charging considering the position and mobility of a device using a radio resource upon charging the use of the radio resource in a wireless communication system, according to an embodiment of the present disclosure. FIG. 2 is a view illustrating an example of a wireless communication system performing charging according to an embodiment of the present disclosure.

Referring to FIG. 2, the wireless communication system 200 is assumed to be, e.g., a LTE system for ease of description. Thus, the wireless communication system includes a M2M communication device to which charging for use of radio resources may be applied or a UE 202 corresponding to a general mobile device, according to an embodiment of the present disclosure.

An eNB 204 may identify a target device which is charged for use of radio resources, i.e., a M2M communication device or general mobile device, upon sensing use of a radio resource of a UE positioned in each CC provided by the eNB 204, gather charging-related information for the use of the radio resource of the UE and transfer a network entity that generates a CDR, e.g., a mobile manage entity (MME), an S-GW 206, or a P-GW 208, or may directly generate charging information, according to an embodiment of the present disclosure.

The P-GW 208 may generate a CDR based on the UE's charging information received from the eNB 204, according to an embodiment of the present disclosure.

Specifically, the eNB 204 may gather charging information for the usage or use time of radio resource of the UE based on a predetermined charging reference, according to an embodiment of the present disclosure According to an embodiment of the present disclosure, charging references may be defined as follows. The service provider may apply at least one of the charging references to make such a setting that charging for usage or use time of radio resource of the UE is executed on the eNB 204, S-GW, or P-GW 208.

Figure 3A:
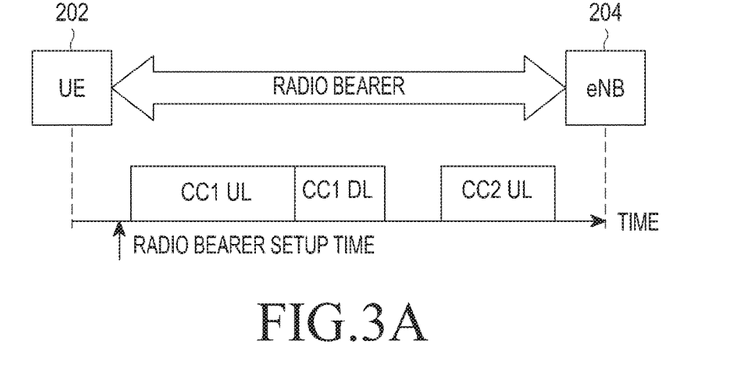
FIG. 3A illustrates an example of setting a radio resource use time based on charging according to an embodiment of the present disclosure.

According to an embodiment of the present disclosure, charging references may be set as at least one of largely three factors, i.e., use time of radio resource of UE, data channel usage, and control channel usage, or a combination thereof.

Where the use time of radio resource is set as a charging reference, at least one of a radio bearer activation time for the UE, transmission time per CC, or total transmission time may be chosen as use time of radio resource. In this case, where the radio bearer activation time is set as use time of radio resource, the eNB 204 or the P-GW 208 may determine that the time when a radio bearer established between the UE 202 and the eNB 204 is activated is the use time of radio resource. Here, the radio bearer activation time corresponds to a time during which a signaling or data radio bearer is established and is then released. The radio bearer activation time may be defined as a time from when the UE turns into a RRC_CONNECTED state to when the UE turns into a RRC_IDLE state, i.e., a time from when the eNB 204 receives, from the UE 202, a RRC Connection Setup Complete message or a RRC Connection Reestablishment Complete message to when the eNB 204 sends a RRC Connection Release message. FIG. 3A is a view illustrating an example of setting a radio resource use time based on charging according to an embodiment of the present disclosure. Referring to FIG. 3A, a radio bearer is established between the UE 202 and the eNB 204. The eNB or P-GW deems a time from when the radio bearer is established to when the radio bearer is released as use time of radio resource and may use such time as a reference to determine charging.

Or, it may be based on the transmission time of signals communicated between the UE and the eNB. Here, the signals communicated may include all of the UE's uplink (UL) or downlink (DL) control/data signals. Where the per-CC transmission time is set as use time of radio resource, the eNB 204 first identifies the CC of the corresponding UE. According to an embodiment of the present disclosure, such a scenario is assumed that information about random access channel (RACH) resource assigned to each CC is previously set, and the eNB 204 previously broadcasts relevant information to UEs positioned in a service coverage of the eNB 204. In such case, the UE 202 may determine CC of the UE 202 through the strength of a signal received from the eNB and attempt initial access to the CC using a preset RACH resource. Accordingly, the eNB 204 may identify the CC corresponding to the RACH resource reported by the UE 202 and apply a charging reference corresponding to the identified CC to the UE. In the RRC_CONNECTED state, the UE may update the CC. Thus, where the eNB 204 identifies that the CC of the UE 202 is changed, the eNB 204 may measure the UE's resource transmission time per CC. Therefore, the eNB 204 may apply the charging reference corresponding to the changed CC to the UE 202 and apply charging differently. Thereafter, charging for use of radio resource of the UE may be fulfilled based on charging information generated by the eNB 204 or P-GW 208, according to an embodiment of the present disclosure. In this case, the service provider may impose discrimination on charging load corresponding to the per-CC resource operation scheme set by the service provider.

As a specific example, as per the per-CC resource operation scheme, a predetermined use time of radio resource may be determined as default based on, e.g., CC1 (e.g., CC1 130 of FIG. 1) corresponding to being on the ground. Where the use time of radio resource of the UE positioned in another CC increases beyond a predetermined level with respect to the default, operation modified to fit for the characteristics of each CC may be performed—e.g., charging an additional fee in proportion to the increased time with respect to the default, or charging the same fee rate given for the default while providing a poorer quality of service than the one provided for the default, or charging an additional fee in proportion to the reduced time with respect to the default or providing a better quality of service than that provided for the default while remaining at the same fee rate given for the default. The afore-described per-CC resource operation scheme is merely an example, and other various modifications or changes may be made thereto depending on the service provider's intention. The actual charging process of the UE based on the charging information according to an embodiment of the present disclosure is irrelevant to what is proposed herein, no further detailed description of which is given herein.

Where the total transmission time is set as use time of radio resource, the eNB may choose the overall data transmission/reception time of the UE as the total transmission time. Here, where the UE has mobility, the overall data transmission/reception time may be calculated as the sum of data transmission/reception times for each CC where the UE is positioned.

Figure 3B:
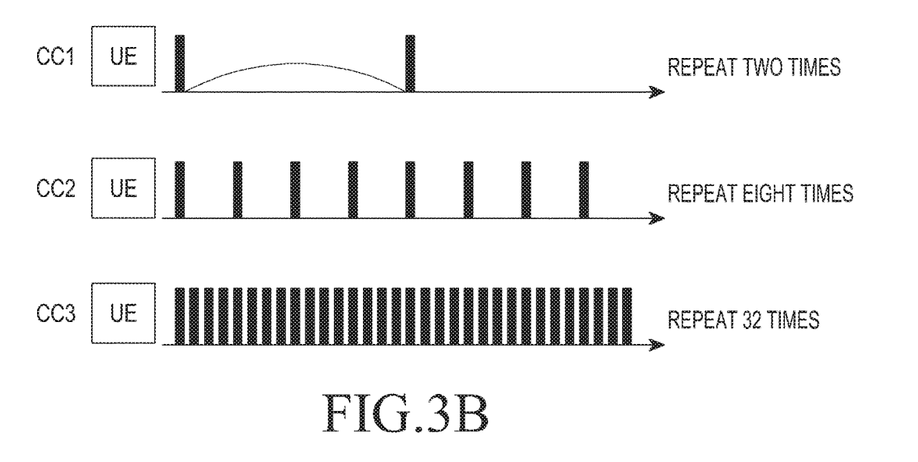
FIG. 3B illustrates an example of the number of times of repetition per CC according to an embodiment of the present disclosure.

Next, where the data channel usage is set as a charging reference, at least one of an initial transmission data amount, a per-CC transmission data amount, and a total transmission data amount may be chosen as data channel usage. In this case, where the initial transmission data amount is determined to be the data channel usage, the eNB may identify the CC and initial transmission data amount of the UE and calculate the data channel usage using the identified initial transmission data amount and the number of times of repetition mapped to the identified CC. FIG. 3b is a view illustrating an example of the number of times of repetition per CC according to an embodiment of the present disclosure. Referring to FIG. 3B, an example is shown in which a different number of times of repetition of data transmission is set for each CC given per-CC transmission efficiency. Here, the number of times of repetition reduces as the size of CC decreases. Thus, transmission time and amount of transmission also diminish. For example, for CC2 which is smaller in size than CC3, the number of times of repetition reduces, resulting in the transmission time and amount of transmission being decreased.

The eNB 204 may identify an initial amount of transmission of the UE and may obtain the data channel usage of UE by multiplying the initial amount of transmission by the number of times of repetition mapped to the identified CC.

Where the total transmission data amount is determined to be the data channel usage, the eNB may use the total amount of data communicated by the UE as the data channel usage. In other words, the total amount of data communicated by the UE may be calculated by including the amount of data transmitted on the UL and the amount of data received on the DL. Where the UE has mobility, the total amount of data communicated by the UE may likewise be calculated as the sum of the total amounts in each CC where the UE is positioned.

Figure 3C:
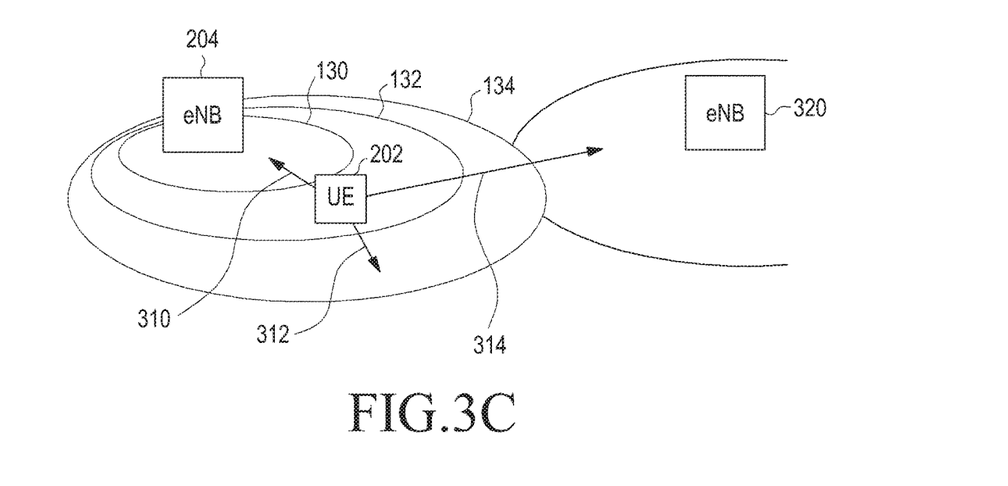
FIG. 3C illustrates an example of a CC change or cell reselection of a mobile CIoT device according to an embodiment of the present disclosure.

As compared with CIoT devices without mobility, CIoT devices with mobility may be subject to use of additional radio resources during the course of a CC change or cell change. FIG. 3C is a view illustrating an example of a CC change or cell reselection of a mobile CIoT device according to an embodiment of the present disclosure.

Referring to FIG. 3C, a UE 202 corresponding to a mobile CIoT device is shown to be currently positioned in a CC2 132 among CCs 130 to 134 provided by an eNB 204. As the user moves, the UE 202 may be subject to a change to another CC, i.e., CC1 130, provided by the eNB 204 as indicated by reference number 310 or CC3 134 as indicated by reference number 312. In the cases of reference numbers 310 and 312, the CC changes experienced by the UE 202 are counted. Or, as indicated by reference number 314, a cell change may arise, meaning that the UE 202 moves to the service coverage of another eNB 320. In such case, the cell reselections by the UE are counted.

Accordingly, where the control channel usage is set as a charging reference, at least one of the frequencies of CC changes experienced by the UE and the frequency of cell reselections may be chosen as the control channel usage. Where the frequency of CC changes is chosen as the control channel usage, the eNB or P-GW may configure the frequency of CC changes for the UE, which is in the RRC_CONNECTED state, as charging information, according to an embodiment of the present disclosure. Although the frequency of CC changes and the frequency of cell reselections are described as examples of the control channel usage, the control channel usage is not necessarily limited thereto. As another example, an example of using other control channels may be measured as the control channel usage and may be utilized as charging the UE.

Charging information generated by the eNB or P-GW based on charging references may include additional parameters as presented in Table 5 below, according to an embodiment of the present disclosure. The parameters set forth in Table 5 may be added to an existing CDR as new charging information.

TABLE 5

| Parameter name | Description | Format/ sample |
| --- | --- | --- |
| Radio bearer activation time | Time during which radio bearer between eNB and UE is activated | ms or seconds |
| Per-CC data reception time | Time that UE positioned in CC receives DL data from eNB | ms/cc2 |
| Per-CC data transmission time | Time that UE positioned in CC transmits UL data to eNB | |
| Total time | Sum of per-CC data reception time and data transmission time | Ms |
| Per-CC DL data volume | Amount of DL data received from eNB by UE positioned in CC | Bytes/cc1 |
| Per-CC UL data volume | Amount of UL data transmitted to eNB by UE positioned in CC | |
| Initial transmission data volume | Amount of data initial,y transmitted by UE positioned in CC | Bytes |
| Repetition count | Number of times of repetitive transmission of initial transmission data during predetermined time interval where position has previously been determined in CC | |
| Overall data volume | Sum of amount of DL data received from eNB by UE positioned in CC and amount of UL data transmitted to eNB by UE positioned in CC | Bytes |
| Mobility information | Information indicating mobility of UE, frequency of CC changes by CC, or frequency of cell selections and reselections | |

The parameters listed in Table 5 above are merely an example. Other additional information than the parameters exemplified may be available to generate charging information, and such additional information may be set by the communication carrier.

Figure 4:
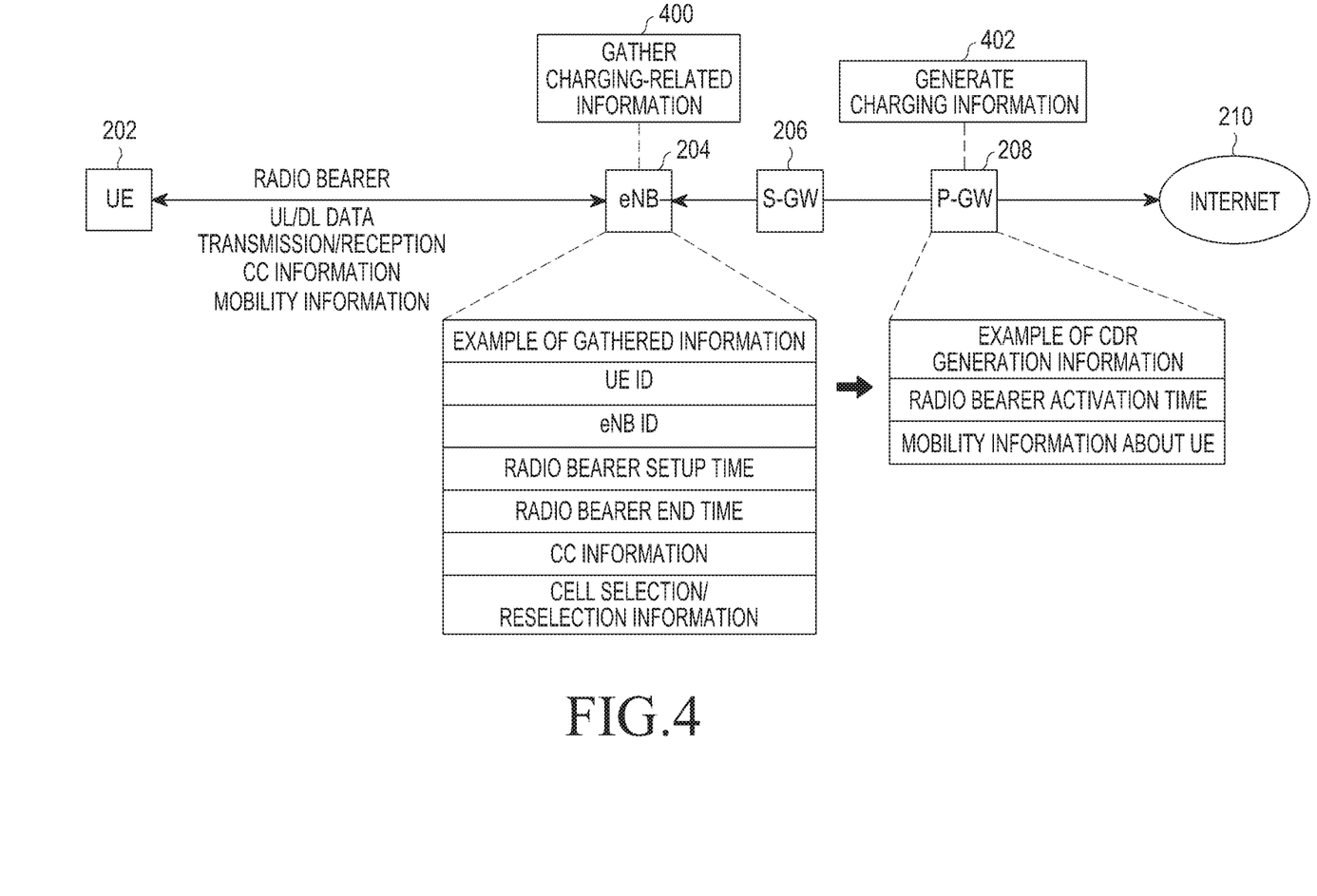
FIG. 4 illustrates an example of a communication system performing a charging operation according to an embodiment of the present disclosure.

FIG. 4 illustrates an example of a communication system performing a charging operation according to an embodiment of the present disclosure.

Referring to FIG. 4, according to an embodiment of the present disclosure, the eNB 204 may gather charging-related information as indicated by reference number 400 and transfer to the P-GW 208, and the P-GW 208 may generate charging information based on the above-described charging references as indicated by reference number 402. Alternatively, the eNB 204 may generate charging information based on gathered charging-related information and transfer to the P-GW 208.

Figure 5A:
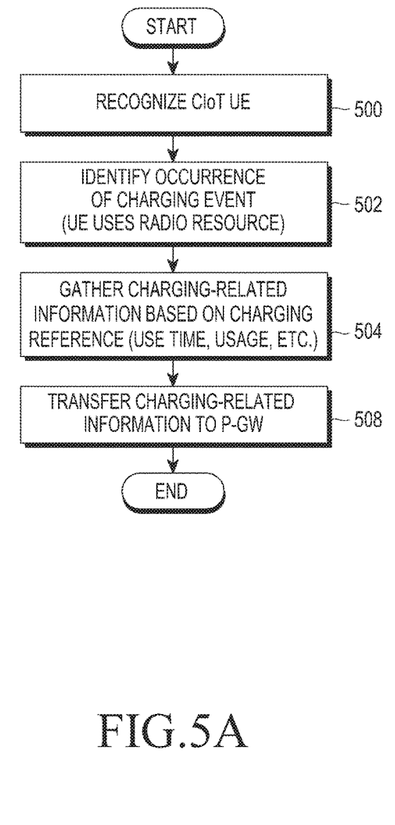
FIG. 5A illustrates example operations by an eNB according to an embodiment of the present disclosure.

FIG. 5A illustrates example operations by an eNB according to an embodiment of the present disclosure.

Referring to FIG. 5A, it is assumed in operation 500 that the eNB 204 has identified the existence of the UE 202 corresponding to a CIoT device positioned within the service coverage of the eNB 204. In operation 502, the eNB 204 identifies whether the UE's charging event occurs, i.e., whether use of a radio resource occurs. Here, the charging event may be identified based on charging references according to an embodiment of the present disclosure. Here, the charging references may be set as at least one of use time of radio resource of UE, data channel usage, and control channel usage, or a combination thereof, as described above. A method for setting a charging reference depending on each use time or usage has been described above, and no further description thereof is thus given. In operation 504, the eNB 204 may gather charging-related information upon reception of UL data and transmission of DL data through a radio bearer established with the UE 202 based on the charging references. The eNB 204 may also obtain mobility information or CC information about the UE 202 through the initial access and process of establishing radio bearer and subsequent signaling. Here, the mobility information, when the UE 202 is a CIoT device with mobility, may include the frequency of CC changes and cell selections and reselections occurring in the UE 202. The charging-related information gathered by the eNB 204 may include at least one of ID information of the UE 202, ID information of the eNB, activation time of radio bearer established with the UE 202, data and control channel use time or usage, CC information and cell selection/reselection-related information, or amount of DL data received or UL data transmitted in the CC where the UE 202 is positioned. Where the CC information of the UE 202 is one for the case where the UE 202 is positioned in two or more CCs, the charging-related information may include the amount of DL data received or UL data transmitted in each CC. The charging-related information here is provided as an example, and the charging-related information may also be generated further using additional information for generating charging information based on the above-mentioned charging references.

Figure 5B:
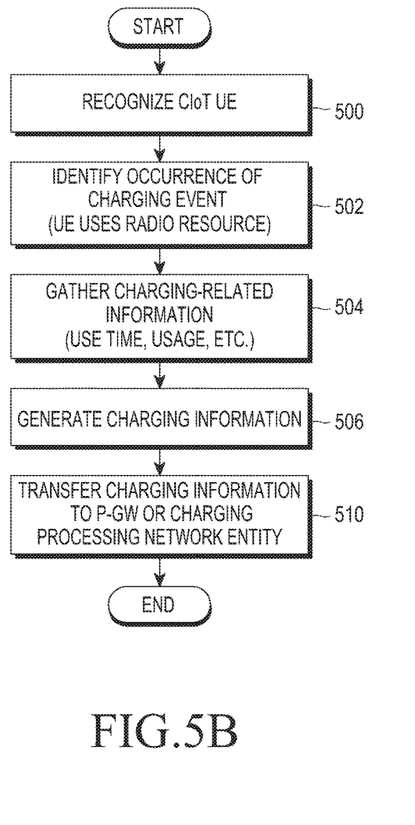
FIG. 5B illustrates example operations by an eNB to process gathered charging-related information according to an embodiment of the present disclosure.
Figure 6A:
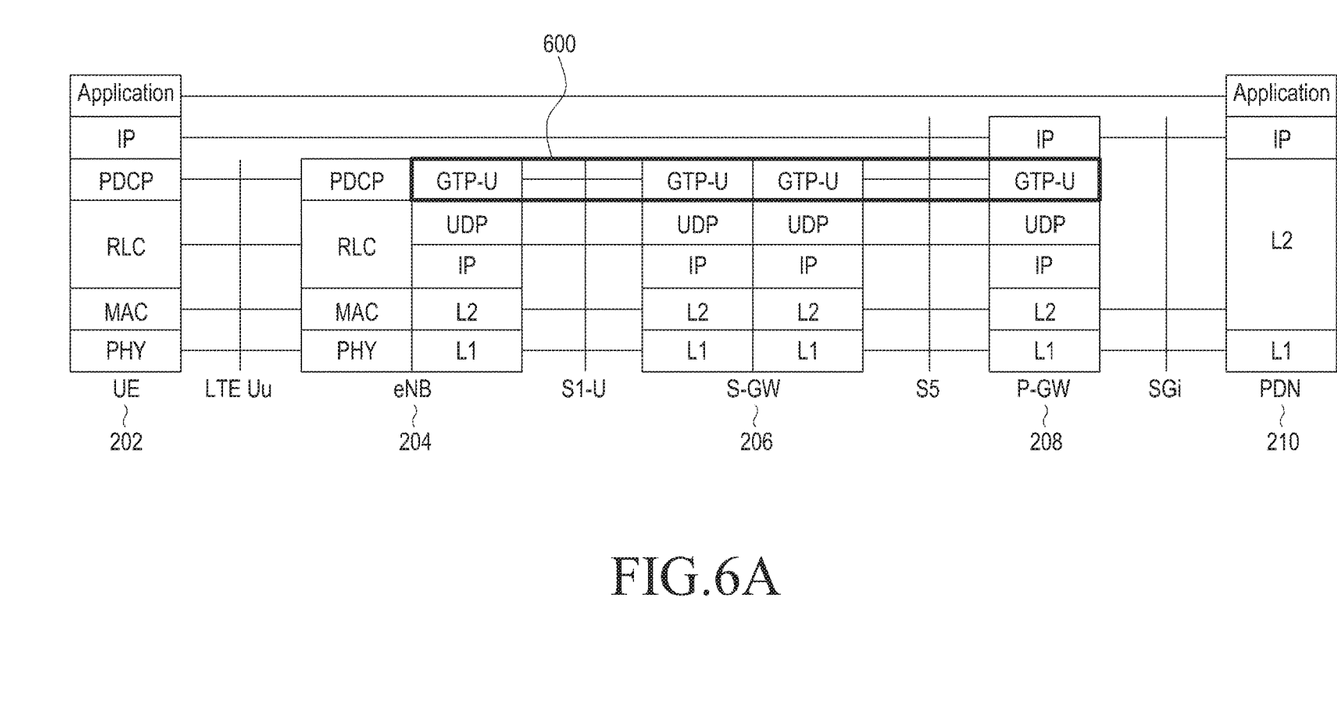
FIG. 6A illustrates an example of a protocol stack according to an embodiment of the present disclosure.

According to an embodiment of the present disclosure, when the charging-related information is gathered, the eNB 204 may go through one of the following options before transferring through the S-GW 206 to the P-GW 208 in operation 508. First, the eNB 204 may deliver the gathered charging-related information, as it is—without performing a separate process or treatment thereon—through the S-GW 206 to the P-GW 208. Or, the eNB 204 may perform a charging information generation function according to an embodiment of the present disclosure to process the gathered charging-related information in a similar manner to that for charging information or generate charging information and transfer through the S-GW 206 to the P-GW 208. Or, delivery to the S-GW may also be taken into account depending on the network provider's settings. FIG. 5B illustrates example operations by an eNB to process gathered charging-related information in a similar manner to that for charging information or generate charging information according to an embodiment of the present disclosure. Referring to FIG. 5B, operations 500 to 504 are substantially the same as the operations of the eNB 204 described above in connection with FIG. 5A, and thus, no repetitive description thereof is presented. The eNB 204 then generates charging information based on the charging-related information gathered in operation 506. The generated charging information may also include a radio bearer activation time, data and control channel use time or usage, and mobility information about the UE 202 as exemplified in FIG. 4. The eNB 204 transfers the generated charging information, instead of charging-related information, through the S-GW 206 to the P-GW 208 in operation 508. Here, the eNB 204 may transfer the charging information or charging-related information having undergone one of the above options through the S-GW 206 to the P-GW 208 using a control plane message format as defined in 3GPP standards, i.e., general packet radio service tunneling protocol-control plane (GTP-C) format. FIG. 6A illustrates an example of a protocol stack where an eNB transmits charging information or charging-related information, which has undergone one of the options, using a GTP-C format, according to an embodiment of the present disclosure;

Referring to FIG. 6A, the eNB 204 may include the charging-related information or charging information in a legacy control message and transfer to the P-GW 208. Alternatively, the eNB 204 may define a new format of message for including and transmitting the charging-related information or charging information and transfer the charging-related information or charging information through the new format of message to the P-GW 208. The charging-related information or charging information-containing message is delivered through a GTP tunneling to the S-GW 206 and P-GW 208 as indicated by reference number 600. Here, the GTP tunneling is unilateral and is transferred from the eNB 204 only to the S-GW 206 and P-GW 208.

Figure 6B:
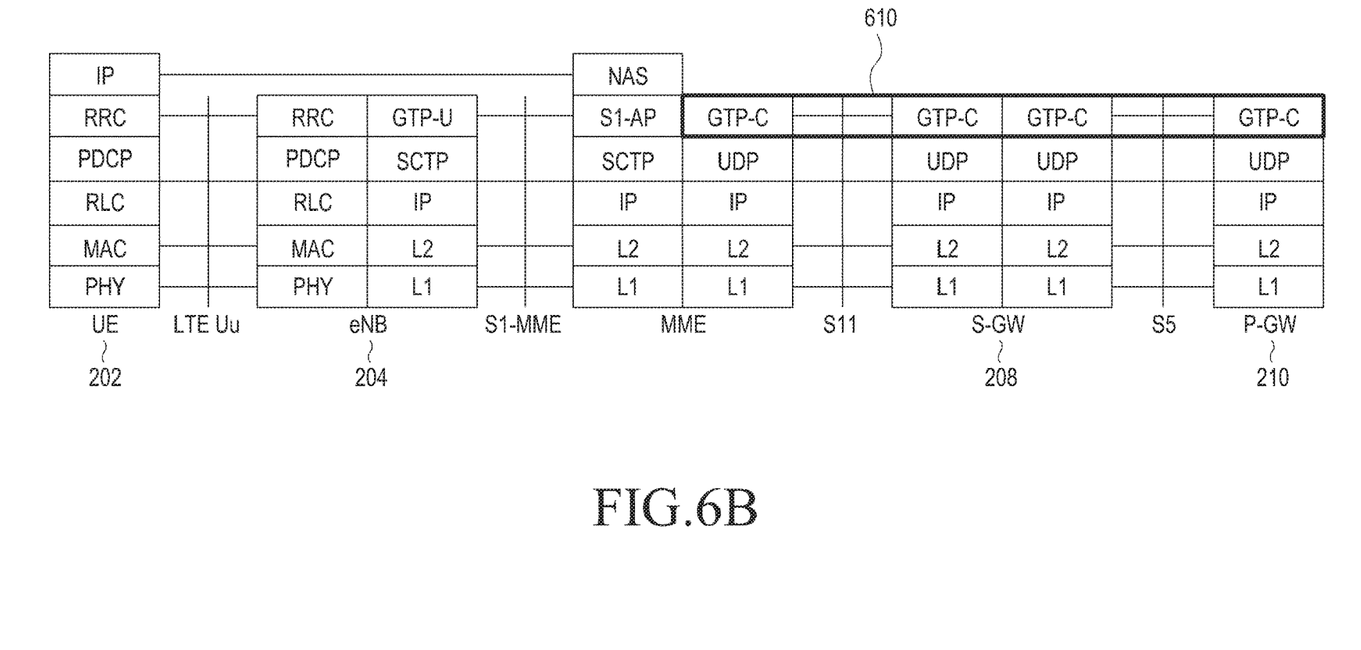
FIG. 6B illustrates another example of a protocol stack according to an embodiment of the present disclosure.

According to an embodiment of the present disclosure, the eNB 204 may include the charging-related information or charging information having undergone one of the above options in a user plane message, e.g., a GTP-user plane (GTP-U) format message, and transfer the same. FIG. 6B is a view illustrating an example of a protocol stack where an eNB transmits charging information or charging-related information, which has undergone one of the options, using a GTP-U format, according to an embodiment of the present disclosure.

Referring to FIG. 6B, the eNB 204 transfers a message containing the charging-related information or charging information through a GTP tunneling to the S-GW 206 and P-GW 208 as indicated by reference number 610. Here, the GTP tunneling is unilateral and is transferred from the eNB 204 only to the S-GW 206 and P-GW 208. Transmission of the charging-related information or charging information through the GTP-C or GTP-U may be performed when the eNB 204 gathers the charging-related information, periodically or at a particular time after the eNB 204 performs a process or treatment on the charging-related information, or when a particular event occurs, e.g., when requested to do so by a higher entity or when information corresponding to a predetermined amount is gathered.

Not only does the P-GW 208 receive charging-related information from the eNB 204 and generate charging information but the S-GW 206 may also receive charging-related information from the eNB 204 and generate charging information.

Figure 7:
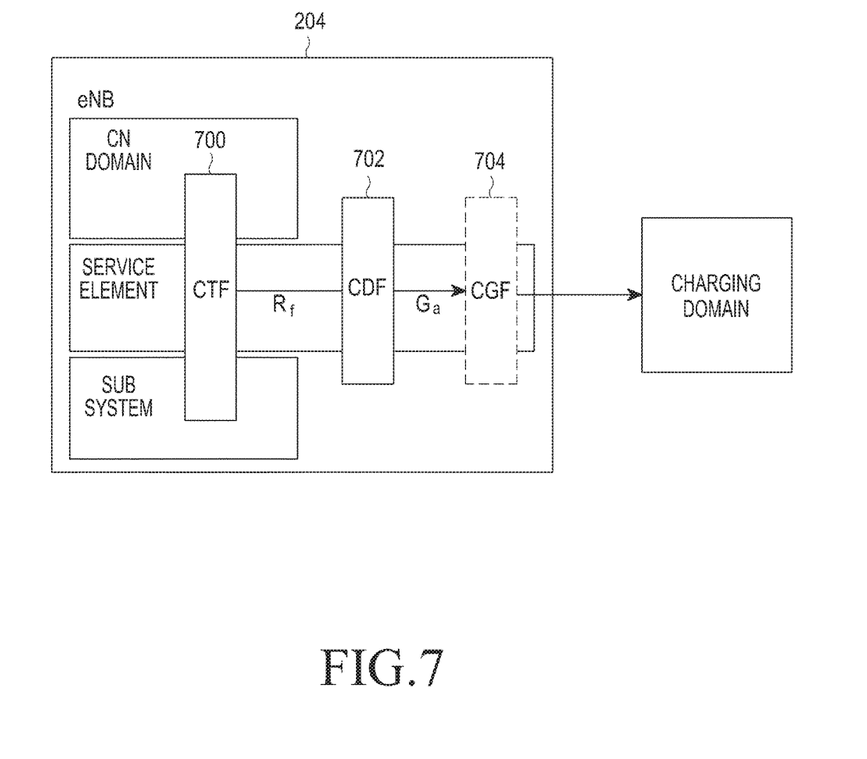
FIG. 7 illustrates an example of a configuration of an eNB performing a charging operation according to an embodiment of the present disclosure.

FIG. 7 illustrates an example of a configuration of an eNB performing a charging operation according to an embodiment of the present disclosure.

Referring to FIG. 7, although not shown in the figure, the eNB 204 may include a transceiver transmitting and receiving signals to/from the UE and transmitting and receiving signals to/from another entity and a controller. The controller may perform, e.g., a charging trigger function (CTF) 700, a charging data function (CDF) 702, and a charging gateway function (CGF) 704 in order to charge a CIoT device for use of radio resources. The CTF 700 is integrated into the eNB 204, and the CTF 700 generates a charging event or identifies whether a charging event arises and transfers a result of the identification to the CDF 702. The CDF 702 may generate charging information containing a CDR. According to an embodiment of the present disclosure, the charging information is not limited to a CDR, and charging information may also be generated using other information related to information about use of the communication network by the user. Here, the generated CDR may be specified to have been generated by the eNB (e.g., in the form of "eNB-CDR") in order to differentiate from charging information generated by the P-GW.

According to an embodiment of the present disclosure, where the CDF 702 generates a CDR for the UE, the generated CDR may be delivered through the P-GW to the service provider's charging domain. In this case, the P-GW may perform a CGF to transfer the received CDR to a charging domain corresponding to a charging information gathering server or device operated by the service provider. Or, as shown in FIG. 7, the eNB 204 may perform the CGF 704 to transfer the generated CDR to the charging domain. Accordingly, the CFG 704 constituting the eNB 204 may selectively be included according to an embodiment of the present disclosure. Where the eNB 204 performs the CGF 704, the CDR generated by the CDF 702 is transferred to the charging domain periodically, at a particular time, when a particular event occurs, or when requested by a higher entity. The period, time, or event where the charging information is delivered may be set up by the service provider.

Thereafter, when the charging information for use of radio resource by the CIoT device is transferred to the charging domain, the CIoT device is charged based on a predetermined PCC rule for use of radio resource, according to an embodiment of the present disclosure The PCC rule for use of radio resource is set by the communication carrier, and has no bearing on specific operations according to the present disclosure, and no further description thereof is thus given. Meanwhile, according to an embodiment of the present disclosure, when the charging information for use of radio resource by the CIoT device is generated by the P-GW, the P-GW generates charging information based on the charging-related information received from the eNB, corresponding to the operations for generating charging information by the eNB as described above in connection with FIG. 7 and transfers to the charging domain.

According to an embodiment of the present disclosure, when CIoT devices, along with general devices, perform M2M communication through part of the bandwidth provided by the mobile communication system, charging may be performed for use of limited radio resources, enabling more efficient use of limited radio resources in the wireless communication system.

Particular aspects of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for charging by a base station in a wireless communication system, the method comprising:
upon sensing use of a radio resource by a device performing machine-to-machine (M2M) communication, gathering, by the base station, charging-related information associated with the sensed use of the radio resource based on a charging reference of the radio resource; and transmitting, by the base station, the charging-related information to a higher entity, wherein the charging reference is determined based on at least one of a use time of the radio resource, a usage of the radio resource, or mobility information of the device, and wherein the mobility information of the device is determined based on a position of the device.

2. The method of claim 1, wherein the charging-related information is transmitted to the higher entity at a preset time, periodically, when an amount of the gathered charging-related information reaches a preset threshold, or when requested by the higher entity.

3. The method of claim 1, further comprising:
generating, by the base station, charging information of the device based on the charging-related information; and
transmitting, by the base station, the charging information to the higher entity.

4. The method of claim 3, wherein the charging-related information or the charging information is transmitted through a unilateral tunnel established between the base station and the higher entity, and wherein a message format that is used for transmitting at least one of control information or data information for a mobile communication in the wireless communication system is applied to a unilateral tunneling scheme for establishing the unilateral tunnel.

5. The method of claim 1, further comprising:
when the charging reference is determined based on the use time of the radio resource, obtaining the use time of the radio resource based on at least one of a time during which a radio bearer with the device is established and activated, a transmission time of the device, or a time including a uplink transmission time by the device and a downlink reception time by the device; and
configuring, by the base station, the charging information of the device based on the obtained use time.

6. The method of claim 1, wherein, when the charging reference is determined based on the usage of the radio resource, the usage of the radio resource is obtained based on an usage of an uplink radio resource of the device and an usage of a downlink radio resource of the device, and wherein the charging information of the device is configured based on the obtained usage.

7. The method of claim 1, wherein the mobility information of the device includes at least one of frequency of cell selections and reselections by the device or frequency of changes of a position of the device.

8. The method of claim 7, wherein the position of the device is changed into one of at least two portions separated from a service area of the base station.

9. The method of claim 4, wherein the unilateral tunnel comprises a general packet radio service tunneling protocol (GTP) tunnel.

10. An apparatus for charging by a base station in a wireless communication system, the apparatus comprising:
a controller configured to, upon sensing use of a radio resource by a device performing machine-to-machine (M2M) communication, gather charging-related information associated with the sensed use of the radio resource based on a charging reference of the radio resource; and
a transceiver configured to transmit at least one of the charging-related information from the base station to a higher entity,
wherein the charging reference is determined based on at least one of a use time of the radio resource, a usage of the radio resource, or mobility information of the device, and
wherein the mobility information of the device is determined based on a position of the device.

11. The apparatus of claim 10, wherein the transceiver is further configured to transmit the charging-related information to the higher entity at a preset time, periodically, when an amount of the gathered charging-related information reaches a preset threshold, or when requested by the higher entity.

12. The apparatus of claim 10, further comprising a generator configured to generate charging information of the device based on the charging-related information, wherein the transceiver is further configured to transmit the charging information to the higher entity.

13. The apparatus of claim 12, wherein the transceiver is further configured to transmit at least one of the charging-related information or the charging information through a unilateral tunnel established between the base station and the higher entity, and wherein a message format that is used for transmitting at least one of control information or data information for a mobile communication in the wireless communication system is applied to a unilateral tunneling scheme for establishing the unilateral tunnel.

14. The apparatus of claim 10, wherein, when the charging reference is determined based on the use time of the radio resource, the controller is further configured to:
obtain the use time of the radio resource based on at least one of a time during which a radio bearer with the device is established and activated, a transmission time of the device, or a time including a uplink transmission time by the device and a downlink reception time by the device; and
configure the charging information of the device based on the obtained use time.

15. The apparatus of claim 10, wherein, when the charging reference is determined based on the usage of the radio resource, the controller is further configured to:
obtain the usage of the radio resource based on an usage of an uplink radio resource of the device and an usage of a downlink radio resource of the device; and
configure the charging information of the device based on the obtained usage.

16. The apparatus of claim 10, wherein the mobility information of the device includes at least one of frequency of cell selections and reselections by the device or frequency of changes of a position of the device.

17. The apparatus of claim 16, wherein the position of the device is changed into one of at least two portions separated from a service area of the base station.

18. The apparatus of claim 13, wherein the unilateral tunnel comprises a general packet radio service tunneling protocol (GTP) tunnel.

* * * * *